US006330716B1

(12) United States Patent
Oberhauser

(10) Patent No.: US 6,330,716 B1
(45) Date of Patent: Dec. 11, 2001

(54) APPARATUS AND METHOD FOR ON-LINE REPLACEMENT OF A RUNNING SCRIPT

(75) Inventor: Roy T. Oberhauser, Santa Clara, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/192,081

(22) Filed: Nov. 13, 1998

(51) Int. Cl.[7] .................................................. G06F 9/445
(52) U.S. Cl. ............................................. 717/11; 709/203
(58) Field of Search ............................... 717/11; 209/203, 209/227; 714/4, 38; 700/19; 379/265, 396

(56) References Cited

U.S. PATENT DOCUMENTS

| | | | |
|---|---|---|---|
| 5,659,547 | * | 8/1997 | Scarr et al. ............................... 714/4 |
| 5,732,219 | * | 3/1998 | Blumer et al. ......................... 709/227 |
| 5,754,755 | * | 5/1998 | Smith, Jr. ................................ 714/38 |
| 5,832,070 | * | 11/1998 | Bloom et al. ......................... 379/265 |
| 5,835,712 | * | 11/1998 | DuFresne .............................. 709/203 |
| 6,064,732 | * | 5/2000 | Pezzullo et al. ..................... 379/396 |
| 6,161,218 | * | 12/2000 | Taylor ..................................... 717/11 |
| 6,192,282 | * | 2/2001 | Smith et al. ........................... 700/19 |

* cited by examiner

*Primary Examiner*—Mark R. Powell
*Assistant Examiner*—Hoang-Vu Antony Nguyen-Ba

(57) ABSTRACT

Apparatus and method are provided for accomplishing on-line replacement of a script running in a process. The apparatus and method utilize a script registry that keeps track of the most current script for a particular service. The request for service is presented to the script registry to identify the location of the most current script that provides the requested service. Because this script registry is an internal data structure, it is therefore lightly portable between different operating system machine types. A superscript is further utilized to transfer script state information between execution of the service-providing scripts. This ensures that data information (i.e., execution mode, environment information, and variable data) is passed from a terminating service script to an initializing service script.

20 Claims, 7 Drawing Sheets

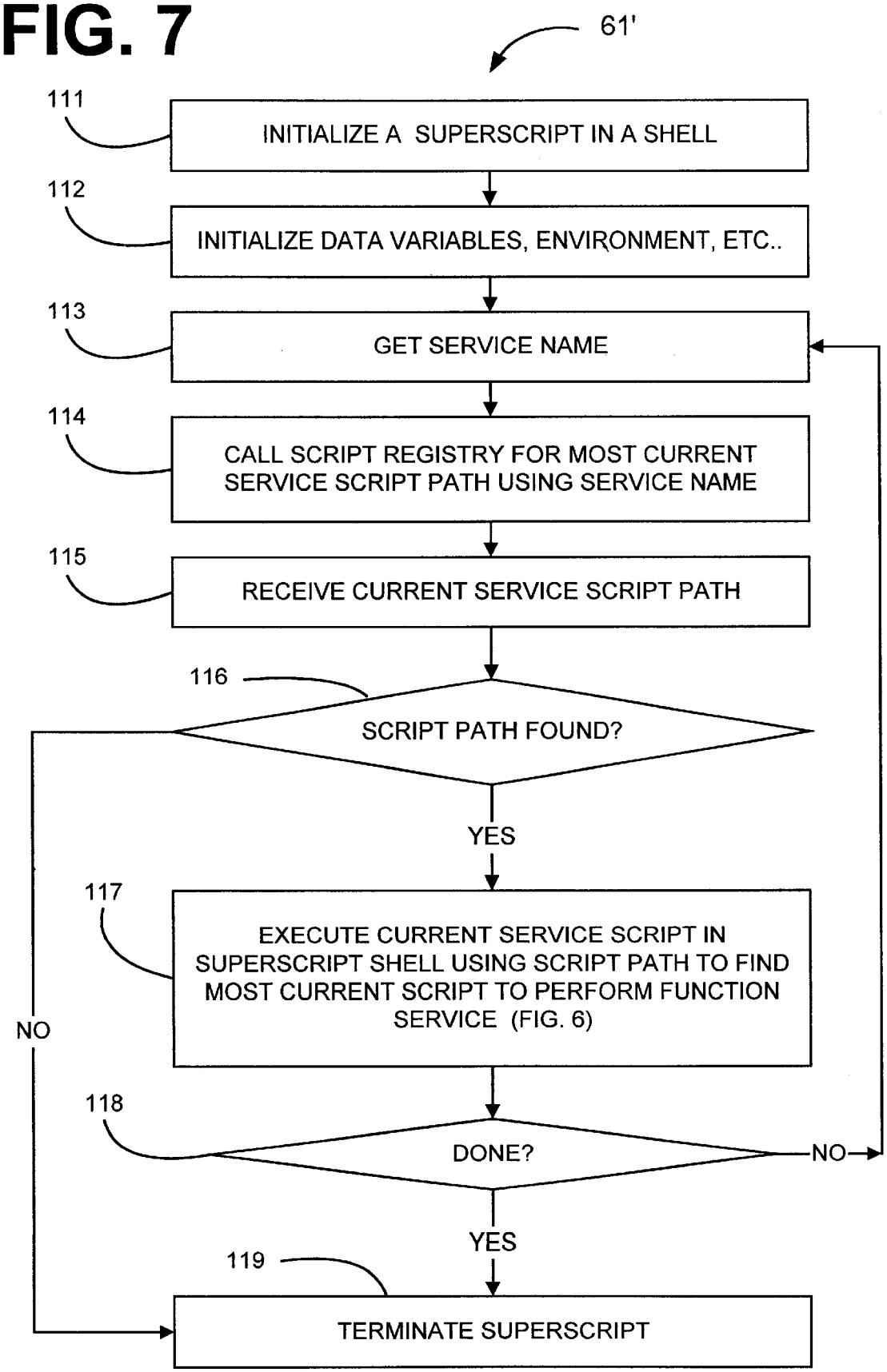

APPARATUS AND METHOD FOR ON-LINE REPLACEMENT OF A RUNNING SCRIPT

BACKGROUND OF THE INVENTION

1. Field of the Invention

The present invention is generally related to a system of processing software scripts directed to computer operations and, more particularly, is related to a system and method for online replacement of a running script within the same process in software.

2. Description of Related Art

As known in the computer and software arts, software scripts undergo many changes during their product life. The changes either enhance the script's functionality through updates or remove problems (i.e., bugs) from the script steps. In either circumstance, the script is usually replaced with a new version of the script.

Typically, when a script is replaced with a new version, the old version of the script is terminated, and the new version is started. This procedure, however, creates a problem where the script operation is interrupted for some time period.

Generally, a script is a sequence of shell commands contained in a text file. There are various ways scripts are executed. Some shells read a line of script, parse it, execute it, and then read the next line. Other shells, such as the well known Perl shell program, parse and compile the entire script into object code before beginning execution. One type of script is a common gateway interface (cgi) script. Generally, a cgi script is invoked when a user clicks on an element in a web page, such as a link or image. Cgi scripts are used to provide interactivity in a Web page. Cgi scripts can be written in many different computer software languages, including C, C++ and Perl. A cgi-bin is a library of cgi scripts applications that can be executed by a processor.

Heretofore, software users have lacked the ability to allow a running script to be replaced with a new version of a script without loss of service or state.

SUMMARY OF THE INVENTION

The present invention provides a system and method for on-line replacement of a running script within the same environment. In accordance with one aspect of the invention, the apparatus and method utilize a script registry that keeps track of the most current script for a particular service. The request for service is presented to the script registry to identify the location of the most current script that provides the requested service.

In accordance with another embodiment of the apparatus and method of the present invention, a script registry is utilized to maintain an index to the service scripts to be performed and the path for that service script to be found. This feature provides additional robust and reliable operation for a user to ensure that all service-providing script locations can be determined from a single reference point and that the most current service script is accessed by the user.

In accordance with yet another embodiment of the apparatus and method of the present invention, the script registry supports service requests from a plurality of service requesters across a network. This feature provides reliable operation for multiple users and ensures that all the users in the network access the same and most current service script from a particular location as opposed to multiple versions of service scripts on a single user system.

In accordance with another embodiment of the apparatus and method of the present invention, a superscript is utilized to transfer script state information between execution of service-providing scripts. This feature provides additional robust and reliable operation to the user to ensure that data information (i.e., execution mode, environment information, and variable data) is passed from a terminating service script to a initializing service script. The state information made available to the newly started service script allows continuity between service script execution.

BRIEF DESCRIPTION OF THE DRAWINGS

The accompanying drawings incorporated in and forming a part of the specification illustrate several aspects of the present invention, and together with the description, serve to explain the principles of the invention. Moreover, in the drawings, like reference numerals designate corresponding parts throughout the several views. In the drawings:

FIG. 7 is a flow chart of an alternative method to update/replace script A with script B utilizing a general superscript to handle all services, receive requests for service, and to save state information as shown in FIG. 3, for the present invention.

DETAILED DESCRIPTION OF THE PREFERRED EMBODIMENT

Figure 1:
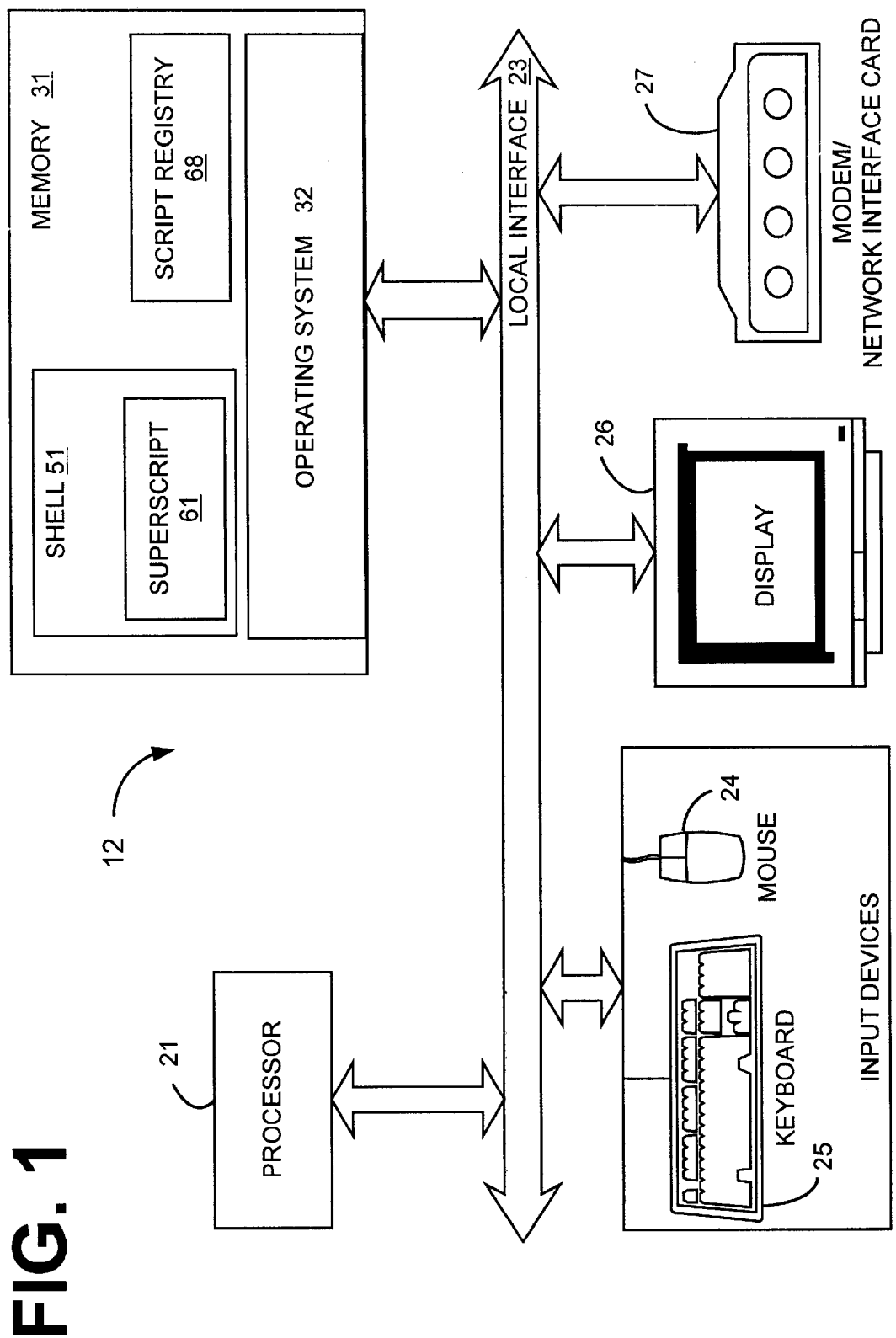
FIG. 1 is a block diagram of a computer system with processes in the system memory of the present invention.

Reference will now be made in detail to the description of the invention as illustrated in the drawings. While the invention will be described in connection with these drawings, there is no intent to limit it to the embodiment or embodiments disclosed herein. On the contrary, the intent is to cover all alternatives, modifications, and equivalents included within the spirit and scope of the invention as defined by the appended claims.

As illustrated in FIG. 1, shown is a computer systems 12 generally comprising a processor 21, and a memory 31 with an operating system 32. The processor 21 accepts data from memory 31 over a local interface 23, such as a bus(es). The memory 31 can be either one or a combination of the common types of memory, for example, but not limited to, erasable programmable read only memory (EPROM), electronically erasable is programmable read only memory (EEPROM), flash memory, programmable read only memory (PROM), random access memory (RAM), read only memory (ROM), flash memory, Dynamic random access memory (DRAM), Static random access memory (SRAM), system memory, or the like. The memory 31 may also include either one or a combination of nonvolatile memory, such as disk drives, tape drives, CDROM drives, cartridges, cassettes, or memory located on a network server. Direction from the user can be signaled by using the input devices, for example, but not limited to, a mouse 24 and a keyboard 25. The action input and result output may be displayed on a display terminal 26.

Stored on the memory 31 is a shell 51, which is a program that interprets scripts, a superscript 61, and a script registry 68 of the present invention. The shell 51 can be implemented in hardware, software, firmware, or a combination thereof. In the preferred embodiment(s), the shell 51, superscript 61, and script registry 68 are implemented in software or firmware that is stored in a memory and that is executed by a suitable instruction execution system.

Figure 2:
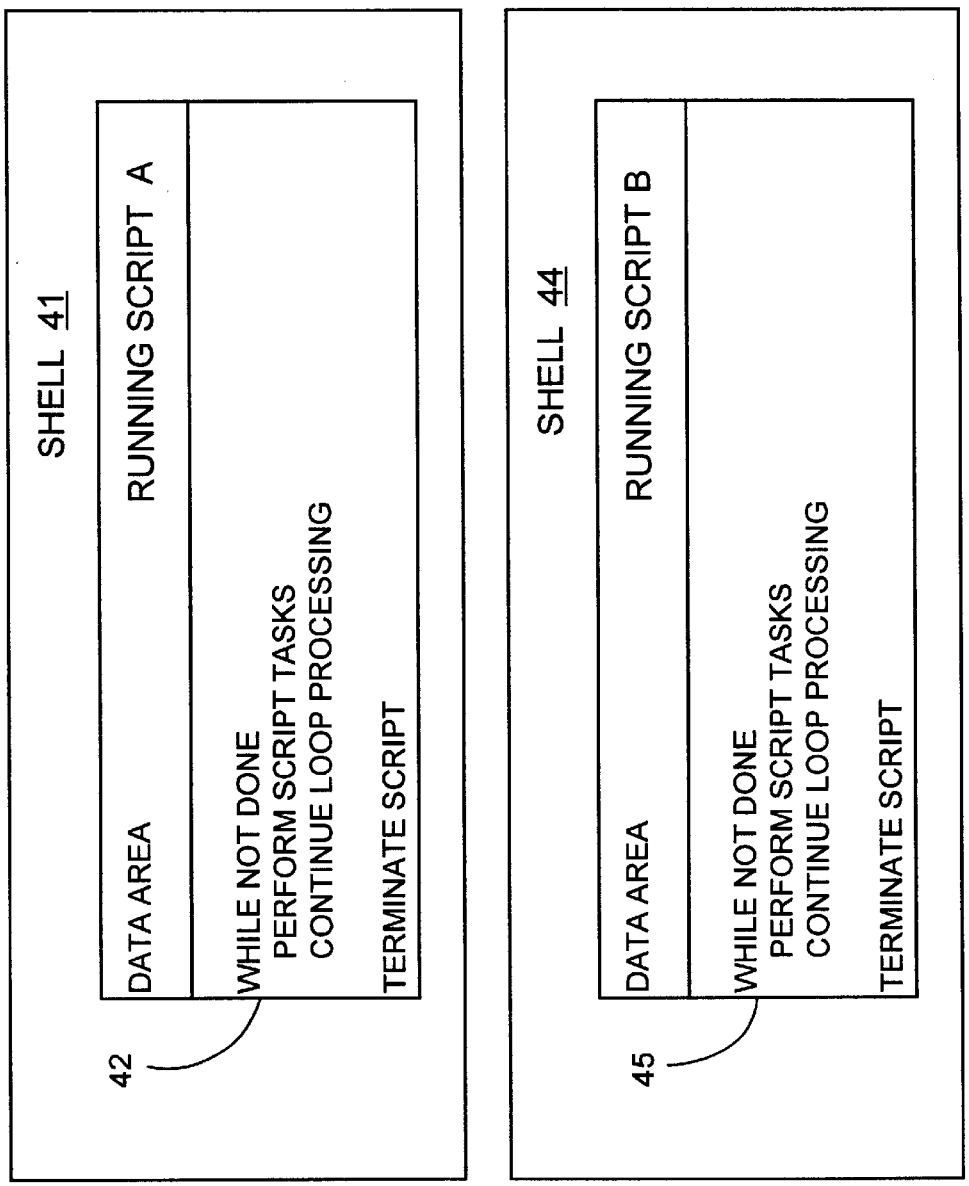
FIG. 2 is a block diagram showing the prior art of transition from a first script A and transitioning state to a second script B.

Illustrated in FIG. 2 is the well known method of executing a script routine. In the environment of the prior art, there is no ability to seamlessly replace an existing script with an updated version without temporarily interrupting the service being performed by the script and undesirable loss of state information. The prior art also lacks the ability to seamlessly update existing scripts. Normally, when a script 42 (script A in FIG. 2) is executing, the script 42 performs its program task until done or terminated. To continue with the service the starting of the script 45 (script B in FIG. 2) is needed to continue processing as shown.

The system requests the execution of a script 42 which then needs to be invoked by a shell 41. Upon termination of the script 42, the shell 41 needs to be terminated as well. Either the user or the computer system 12 must then start shell 44 to continue processing with script 45. This termination of script 42 and shell 41 and the start of shell 44 to run script 45 causes a run time delay. Also, if script 42 is terminated with a status of "not done," then the state of execution of script 42 is unknown to script 45 and could cause potential service failures.

Figure 3:
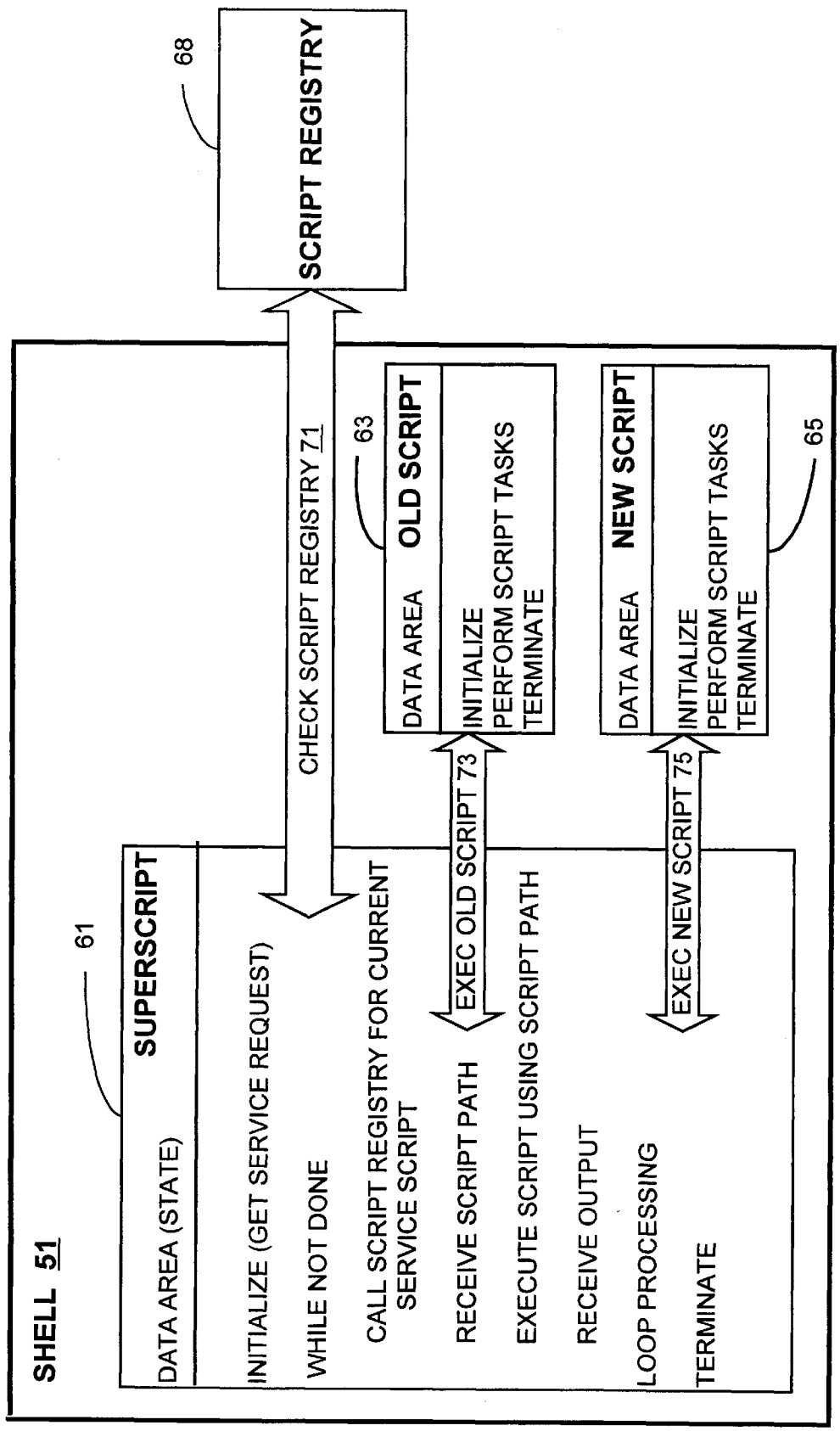
FIG. 3 is a block diagram of the online replacement of a running script system of the present invention showing the transition of data variables between the old script within the shell to the new script running within the shell, utilizing the shell to save and transition data variables.

Illustrated in FIG. 3 is a block diagram of the online replacement of a running script system in accordance with the present invention showing a transition of data state between the old script 63 within the shell 51 to the new script 65 that is also run within the shell 51, utilizing the superscript 61 to save and transition data (including state) variables. The transition between the old script 63 to the new script 65 is determined by utilizing the script registry 68 to ascertain the script path to the newest available script for a particular service.

An advantage of the present invention is that the scripts are initialized, perform the predefined script task, and then terminate, whereas the ongoing service scripts of the prior art repeat themselves by utilizing some kind of a looping structure. In the present invention, the superscript 61 provides the looping structure and continuously executes scripts that provide the requested service and then terminate. Upon the termination of old script 63, the shell 51 need not be terminated to restart new script 65. Since the superscript 61 initiates the execution of the scripts and retains state information regarding the prior script's termination state, the new script may obtain and utilize the state information during execution.

Illustrated in FIG. 3 is shell 51, which is the program that interprets a script. Within the shell 51 is the online replacement of a running script superscript 61 of the present invention. The superscript 61, after initialization, which includes determining what service is being requested, calls the script registry service 68 utilizing the check script registry 71. The script registry service 68 provides a logic 81 for searching a service index 80, herein defined in further detail with regard to FIG. 4

The script registry service 68, in the current embodiment, performs an index table lookup of the service by utilizing the service index 80 to determine the path to the most current service script. The check script registry 71 provides communication of the service name from superscript 61 to the script version service 68. Upon finding the most current path name for a particular service name, the script registry 68 returns the service path name 86 to the most current service script to perform the service via check script registry 71. The superscript 61 receives the script path and executes the old script 63 using the script path. Upon termination of old script 63, the superscript 61 receives any output generated and loops, while not done to repeat the call to script registry service 68 for the most current service script. Upon a change or update to a script, the service index 80 is updated within the script registry service 68. Upon the repeat of the call to script registry 68 for the current service script via check script registry 71, the script registry 68 will return a new service path name 86 for the requested service on check script 71. The superscript 61 receives the script path and executes the new script using the updated script path as shown on execute new script 75 which executes new script 65. After execution of new script 65, any output is returned via the execute new script 75 to t he superscript 61, and the super script repeats the call to script registry 68 for the current service script ongoing request for service is done.

In an alternative embodiment, the superscript 61 can continue the loop processing after the executing script to further minimize the time interruption of service from the script operation. The superscript 61 need not wait for any output to be returned from the executing script and can repeat the call to script registry service 68 for the most current service script.

Figure 4:
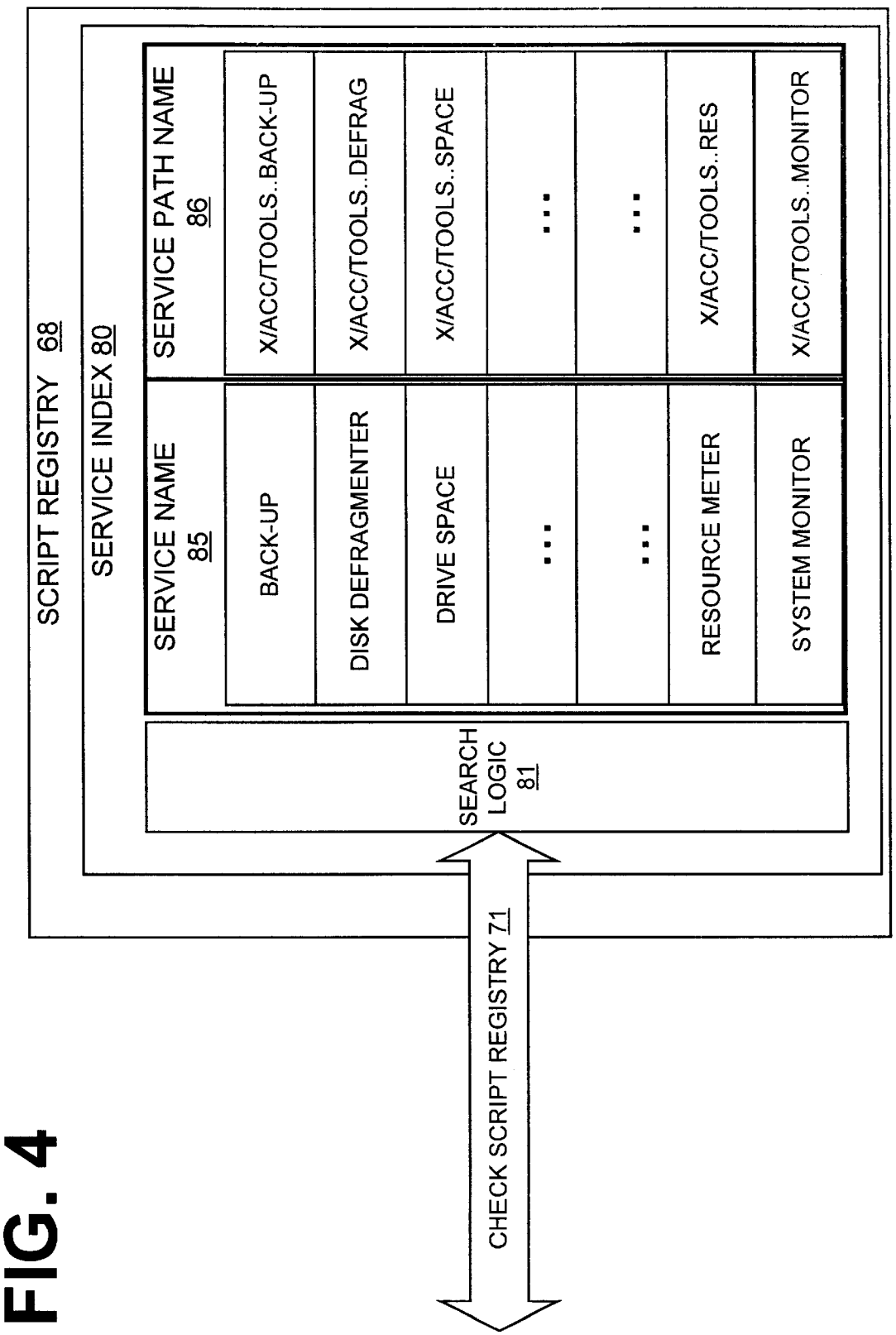
FIG. 4 is a block diagram showing the script registry as shown in FIG. 1, for the present invention.

Illustrated in FIG. 4 is a block diagram of the script registry 68, including the service index 80, of the preferred embodiment. When the superscript 61 (FIG. 3) performs a check script registry 71, the superscript 61 transmits the service name to the script registry 68. The service index 80 receives the service name and performs a search of the service name in the service index 80. This search is performed using the search logic 81, which searches the service index 80 for a service name 85 matching the requested service name. If a matching service name 85 is found, then the service index 80 retrieves the service path name 86 and transmits the requested service path name 86 to the superscript 61 via the check script registry 71 path. If a requested service input from superscript 61 via the check script registry 71 connection is not found within the service index 80 in the service name table 85 utilizing the search logic 81, then the service index will return a "path not found" message to the superscript 61.

Figure 5:
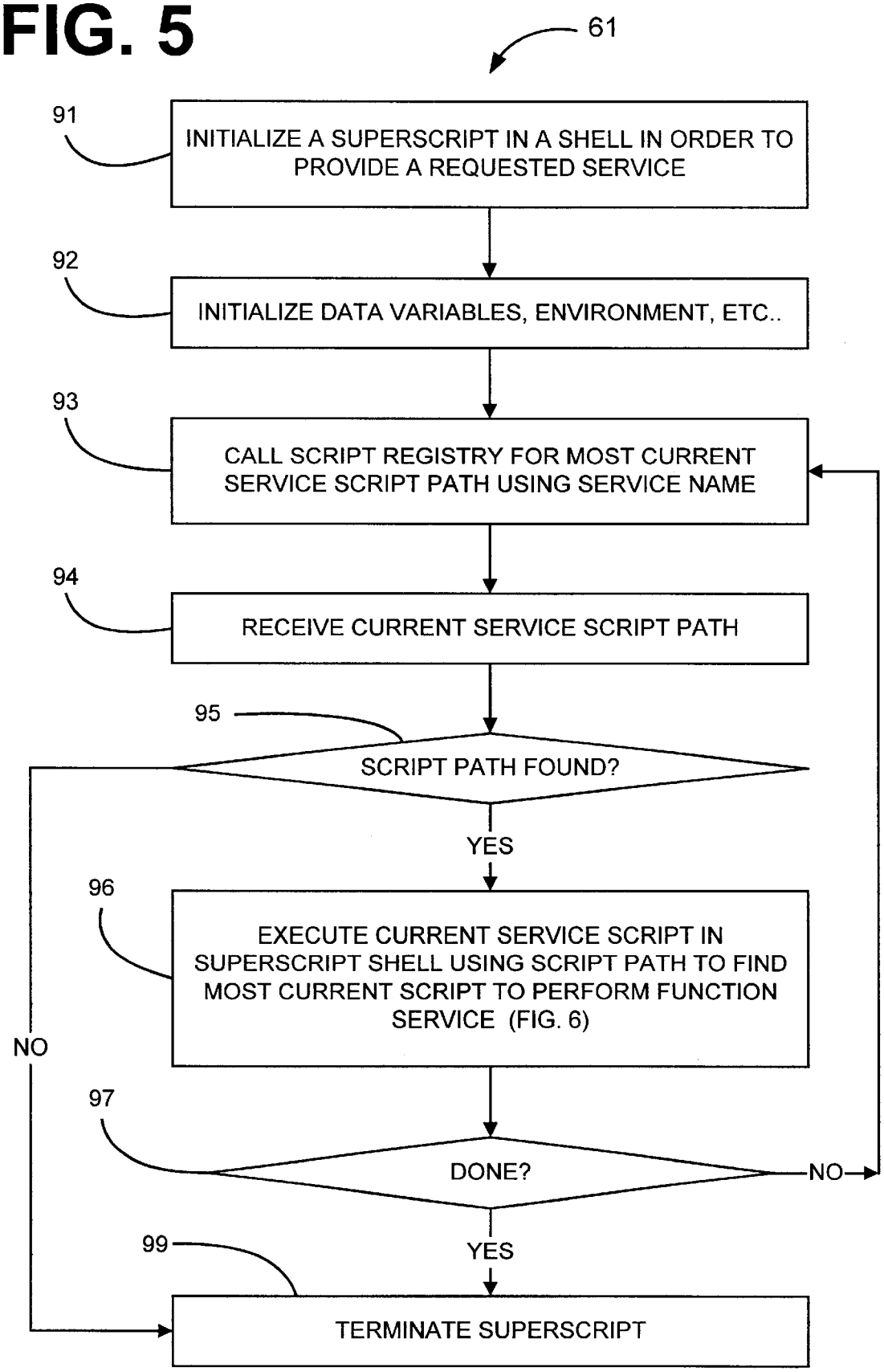
FIG. 5 is a flow chart of the method to update/replace script A with script B utilizing the customized per service superscript to save state information as shown in FIG. 3, for the present invention.
Figure 6:
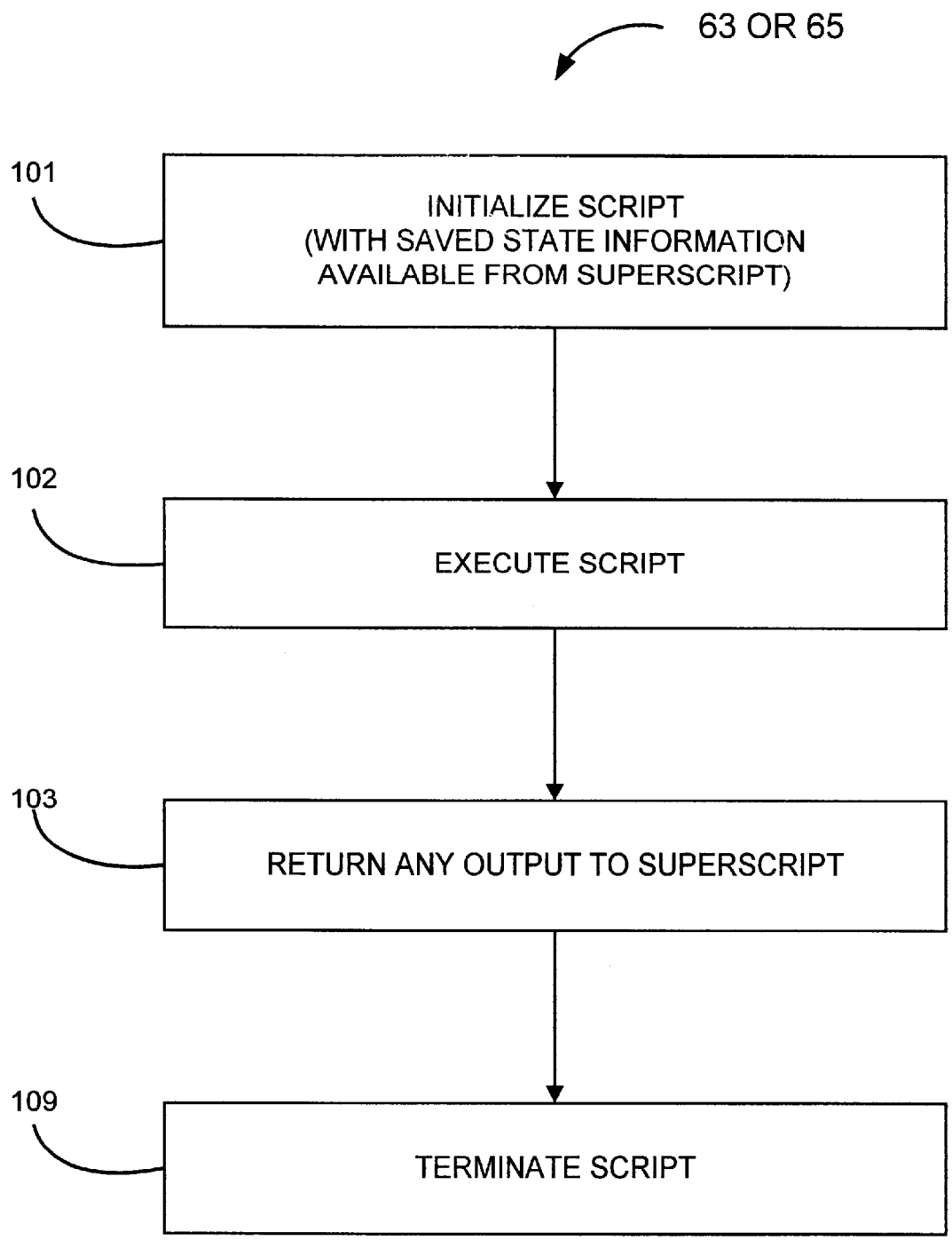
FIG. 6 is a flow chart of the method to execute a script within the shell as shown in FIG. 3, for the present invention.

Illustrated in FIG. 5 is the flow diagram for the superscript 61. The flow diagrams of FIGS. 5–7 shows the architecture, functionality, and operation of a possible implementation of the superscript 61 and service scripts 63 (FIG. 3) and 65 (FIG. 3). In this regard, each block in FIG. 5–7 represents a module, segment, or portion of code, which comprises one or more executable instructions for implementing the specified logical function(s). It should also be noted that in some alternative implementations, the functions noted in the blocks may occur out of the order in which they appear in FIG. 5. For example, blocks shown in succession may in fact be executed substantially concurrently or the blocks may sometimes be executed in the reverse order, depending upon the functionality involved.

With reference to FIG. 5, first, the superscript 61 is initialized in a shell 51 at step 91. In the preferred embodiment, the superscript initialized is a specialized superscript to provide the requested service. In an alternative embodiment, the superscript 61 is a general function superscript that is herein defined with regard to FIG. 7. Referring back to FIG. 5, the superscript 61 initializes the data variables, environment parameters, and the like, at step 92. The superscript 61 transmits a request to the script registry 68 to retrieve the most current service script path 86 at step 93. The most current service script path 86 is identified by the superscript 61 providing the requested service name. The superscript 61 waits to receive the current service script path 86 returned from the script registry 68 at step 94.

Upon return of the current service script path 86, the superscript 61 executes the current service script in the shell 51 using the script service path name 86 to perform the requested service at step 95. The process of the script procedure is herein defined with regard to FIG. 6.

Upon complete execution of the script at step 96 in FIG. 5, the superscript 61 then determines if the requested service is done at step 97. If the requested service is not done, the superscript 61 returns to step 93 to call the script registry 68 to request the current script path using the service requested at step 93. If the superscript 80 is done at step 97, then the superscript 80 terminates and exits at step 99.

Illustrated in FIG. 6 is the flow diagram for the script 63 or 65. The script 63/65 is initialized at step 101. The script 63/65 has access to saved script state information which is available from the data memory areas of superscript 61. This saved script state information can be utilized during the initialization process of the script at step 101. After initialization at step 101, the script 63/65 is executed at step 102. This execution provides the requested service. In the present invention, the scripts 63/65 do not contain any continuous loops in order to allow ordered transition between successive executing scripts. Any output of either data or message as a result of the script 63/65 execution is returned to the superscript 61 at step 103. The script 63/65 then terminates at step 109.

In an alternative embodiment, the superscript 61 may be a general purpose service superscript as is illustrated in FIG. 7. First, the general service superscript 61 is initialized in a shell 51 at step 111. The general superscript 61 initializes the data variables and sets the environment and the like at step 112. The general service superscript 61 then receives requests for service at step 113. The general service superscript 61 calls the script registry 68 requesting the most current service script path 86 at step 114. This call to the script registry 68 includes the requested service name provided to the general service superscript 61 at step 113. The general service superscript 61 then waits to receive the current service script path at step 115. Upon receiving the current service script path, the general service superscript 61 executes the current service script in the shell 51 utilizing the service path name received at step 115 to find the most current script to perform the requested service at step 117. The process of the script that performs the requested service is herein defined above with regard to FIG. 6. The general service superscript 61 then determines if additional requests for service are to be accepted at step 118. If additional requests for service are to be accepted and processed, the general service superscript 61 returns to step 113 to receive a request for service. If the general service superscript 61 determines that no more requests for service are to be processed at step 118, the general service superscript 80 then terminates at step 119.

The on-line replacement of a running script, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the script for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the script is printed, as the script can be electronically captured via, for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A computer apparatus for online script replacement comprising:
    a means for providing a request for service;
    a means for maintaining a list of a plurality of service-providing scripts, wherein said list maintaining means enables a newer service-providing script that provides said requested service to be added to said list;
    a means for determining a current script for providing said requested service from said list of said plurality of service-providing scripts that provide said requested service; and
    a means for executing said current script to provide said requested service.

2. The apparatus of claim 1, further comprising;
    a means for requesting a new current script during the execution of said current script.

3. The apparatus of claim 1, wherein said maintaining means further comprises:

a means for providing, an index to said plurality of service-providing, scripts, further including:

a service name; and a location where the current script for providing said requested service can be found.

4. The apparatus of claim 1, further comprising:

a means for preserving state information for said current script.

5. The apparatus of claim 1, wherein said maintaining means receives requests for a location of said current script across a network.

6. A method for use in computer system for online script replacement, the method comprising the steps of:

providing a request for service;

maintaining a list of a plurality of service-providing scripts, wherein online script replacement is provided by enabling a newer service-providing script that provides said requested service to be added to said list;

determining a current script for providing said requested service from said list of said plurality of service-providing scripts that provide said requested service; and executing said current script for providing said requested service.

7. The method of claim 6, further comprising the step of:

requesting a new current script during the execution of said current script.

8. The method of claim 6, wherein said maintaining step further comprising the step of:

providing an index of said plurality of service-providing scripts, said index includes a service name and a location where the current script for providing said requested service can be found.

9. The method of claim 6, further comprising the step of:

preserving state information for said current script.

10. The method of claim 6, wherein said maintaining step further comprising the step of:

receiving requests for a location of said current script across a network.

11. An online script replacement apparatus comprising:

logic configured to provide a request for service;

logic configured to maintain a list of a plurality of service-providing scripts, wherein said list maintain logic enables a newer service-providing script that provides said requested service to be added to said list logic configured to determine a current script for providing said requested service from said list of said plurality of service-providing scripts that provide said requested service; and logic configured to execute said current script to provide said requested service from said list of a plurality of service-providing script.

12. The apparatus of claim 11, further comprising:

logic configured to request a new current script during the execution of said current script.

13. The apparatus of claim 11, wherein said list maintaining logic further comprises:

logic configured to provide an index to said plurality of service-providing scripts, said index logic including a service name, and a location where the current script for providing said requested service can be found.

14. The apparatus of claim 11, further comprising:

logic configured to preserve state information for said current script.

15. The apparatus of claim 11, wherein said list maintaining logic further comprises:

logic configured to receive requests for a location of said current script across a network.

16. A computer readable medium having a program, the program for replacing scripts online, comprising:

a means for maintaining a list of a plurality of service-providing scripts, wherein said list maintaining means enables a newer service-providing script that provides said requested service to be added to said list;

a means for determining a current script for providing a requested service from said list of said plurality of service-providing scripts that provide said requested service; and a means responsive to the means for determining a current script, for executing said current script to provide said requested service.

17. The medium of claim 16, wherein the means for maintaining includes:

a first routine means, responsive to the means for maintaining, for searching an index to said plurality of service-providing scripts, said index including a service name, and a location where the current script for providing said requested service can be found.

18. The medium of claim 16, further comprising:

a second routine means, responsive to the means for executing, for requesting a new current script during, the execution of said current script.

19. The medium of claim 16, further comprising:

a means recorded on the medium for controlling a preservation of state information for said current script.

20. The medium of claim 16, further comprising:

a means for receiving requests for a location of said current script across a network.

* * * * *